(12) United States Patent
Tsutsumi et al.

(10) Patent No.: US 11,795,843 B2
(45) Date of Patent: Oct. 24, 2023

(54) GAS TURBINE PLANT

(71) Applicants: MITSUBISHI HEAVY INDUSTRIES, LTD., Tokyo (JP); Mitsubishi Heavy Industries Engineering, Ltd., Kanagawa (JP)

(72) Inventors: Atsushi Tsutsumi, Yokohama (JP); Tetsuya Tanaka, Yokohama (JP); Naoyuki Nagafuchi, Yokohama (JP); Takashi Kamijo, Yokohama (JP)

(73) Assignees: MITSUBISHI HEAVY INDUSTRIES, LTD., Tokyo (JP); MITSUBSHI HEAVY INDUSTRIES ENGINEERING, LTD., Kanagawa (JP)

( * ) Notice: Subject to any disclaimer, the term of this patent is extended or adjusted under 35 U.S.C. 154(b) by 39 days.

(21) Appl. No.: 17/628,414

(22) PCT Filed: Jul. 22, 2020

(86) PCT No.: PCT/JP2020/028515
§ 371 (c)(1),
(2) Date: Jan. 19, 2022

(87) PCT Pub. No.: WO2021/015260
PCT Pub. Date: Jan. 28, 2021

(65) Prior Publication Data
US 2022/0228515 A1 Jul. 21, 2022

(30) Foreign Application Priority Data
Jul. 24, 2019 (JP) .................................. 2019-136180

(51) Int. Cl.
*F01K 23/10* (2006.01)
*B01D 53/62* (2006.01)
*F02C 3/34* (2006.01)

(52) U.S. Cl.
CPC ............ *F01K 23/103* (2013.01); *B01D 53/62* (2013.01); *F02C 3/34* (2013.01);
(Continued)

(58) Field of Classification Search
CPC . F01K 23/103; B01D 53/62; B01D 2252/204; B01D 2257/504;
(Continued)

(56) References Cited

U.S. PATENT DOCUMENTS

2006/0248890 A1 11/2006 Iijima et al.
2008/0010967 A1 1/2008 Griffin et al.
(Continued)

FOREIGN PATENT DOCUMENTS

EP 3916207 12/2021
JP 2009-138748 6/2009
(Continued)

OTHER PUBLICATIONS

Written Opinion of the International Searching Authority dated Oct. 13, 2020 in corresponding International Application No. PCT/JP2020/028515, with translation.

*Primary Examiner* — Steven M Sutherland
(74) *Attorney, Agent, or Firm* — Wenderoth, Lind & Ponack, L.L.P.

(57) ABSTRACT

A gas turbine plant includes a gas turbine, an exhaust line, an exhaust heat recovery boiler that generates steam due to heat of exhaust gas and guides the exhaust gas to the exhaust line, a carbon dioxide recovery device that recovers carbon dioxide contained in the exhaust gas, a heat exchanger that cools the exhaust gas to a temperature set in advance, and a circulation line that branches from a position between the carbon dioxide recovery device and the heat exchanger and is connected to an inlet of the gas turbine. The carbon dioxide recovery device has an absorption tower that (Continued)

absorbs carbon dioxide contained in the exhaust gas by causing the exhaust gas at the set temperature and an absorption liquid to come into contact with each other. The heat exchanger is formed of a material having higher corrosion resistance than a material forming the exhaust heat recovery boiler.

8 Claims, 4 Drawing Sheets

(52) U.S. Cl.
CPC .. *B01D 2252/204* (2013.01); *B01D 2257/504* (2013.01); *B01D 2258/0283* (2013.01)

(58) Field of Classification Search
CPC ............... B01D 2258/0283; F02C 3/34; F05D 2260/61; F05D 2260/611
See application file for complete search history.

(56) References Cited

U.S. PATENT DOCUMENTS

| | | |
|---|---|---|
| 2009/0145127 A1 | 6/2009 | Vollmer et al. |
| 2011/0302922 A1 | 12/2011 | Li et al. |
| 2012/0258031 A1* | 10/2012 | Guidolin ............ B01D 53/1475 423/220 |
| 2013/0086916 A1 | 4/2013 | Oelfke et al. |
| 2013/0091853 A1 | 4/2013 | Denton et al. |
| 2013/0104562 A1 | 5/2013 | Oelfke et al. |
| 2015/0007579 A1 | 1/2015 | Curran et al. |
| 2016/0310894 A1 | 10/2016 | Tanaka et al. |
| 2017/0114718 A1 | 4/2017 | Iijima |
| 2018/0058267 A1 | 3/2018 | Uechi et al. |
| 2018/0216532 A1 | 8/2018 | Smith |

FOREIGN PATENT DOCUMENTS

| | | |
|---|---|---|
| JP | 4690885 | 6/2011 |
| JP | 2013-533111 | 8/2013 |
| JP | 2013-535604 | 9/2013 |
| JP | 2013-537596 | 10/2013 |
| JP | 2015-519499 | 7/2015 |
| JP | 2015-139727 | 8/2015 |
| JP | 2015-218634 | 12/2015 |
| JP | 2020-139480 | 9/2020 |
| WO | 2013/143827 | 10/2013 |
| WO | 2016/158561 | 10/2016 |

* cited by examiner

GAS TURBINE PLANT

TECHNICAL FIELD

The present disclosure relates to a gas turbine plant.

Priority is claimed on Japanese Patent Application No. 2019-136180, filed Jul. 24, 2019, the content of which is incorporated herein by reference.

BACKGROUND ART

In a power plant using fossil fuel, for example, in a plant equipped with a gas turbine, high-temperature exhaust gas is generated in accordance with operation of the gas turbine. Regarding a technology for effectively utilizing heat of this exhaust gas, an exhaust heat recovery boiler has been put into practical use (Patent Document 1 below). An exhaust heat recovery boiler is a device generating high-temperature/high-pressure steam due to heat of exhaust gas. Specifically, an exhaust heat recovery boiler has a flue through which exhaust gas of a gas turbine circulates, and a coal economizer, a vaporizer, and a superheater which are arranged in order from a downstream side toward an upstream side inside this flue.

Incidentally, exhaust gas of a gas turbine contains a large amount of carbon dioxide. From a viewpoint of environmental conservation, a technology of removing as much carbon dioxide from exhaust gas as possible is required. Regarding such a technology, for example, the plant described in Patent Document 2 below is known. The plant described in Patent Document 2 is equipped with a gas turbine, an exhaust heat recovery boiler provided along a flue gas path in which exhaust gas of the gas turbine circulates, and a carbon dioxide recovery device. Carbon dioxide contained in the exhaust gas is absorbed and removed by an absorption liquid inside the carbon dioxide recovery device.

CITATION LIST

Patent Literature

[Patent Document 1]
Japanese Patent No. 4690885 [Patent Document 2]
Published Japanese Translation No. 2015-519499 of the PCT International Publication

SUMMARY OF INVENTION

Technical Problem

In the carbon dioxide recovery device described above, a chemical agent having amine as a main component is used as an absorption liquid. This absorption liquid has an appropriate temperature range for efficiently absorbing carbon dioxide.

Namely, when the temperature of exhaust gas is excessively high or excessively low, efficiency of absorption of carbon dioxide deteriorates. Therefore, as in the plant described in Patent Document 2 above, when exhaust gas is directly circulated from an exhaust heat recovery boiler to a carbon dioxide recovery device, due to the excessively high temperature of exhaust gas, there is a likelihood that the efficiency of recovery of carbon dioxide will deteriorate.

The present disclosure has been made in order to resolve the foregoing problems, and an object thereof is to provide a gas turbine plant in which carbon dioxide can be recovered with higher efficiency.

Solution to Problem

In order to resolve the foregoing problems, a gas turbine plant according to the present disclosure includes a gas turbine that is configured to be driven by means of combustion gas generated due to combustion of fuel; an exhaust line that is configured to guide exhaust gas discharged from the gas turbine to the outside; an exhaust heat recovery boiler that is provided in the exhaust line, is configured to generate steam due to heat of the exhaust gas discharged from the gas turbine, and guide the exhaust gas which has passed through the inside of the exhaust heat recovery boiler to the exhaust line; a carbon dioxide recovery device that is provided on a downstream side of the exhaust heat recovery boiler in the exhaust line and is configured to recover carbon dioxide contained in the exhaust gas flowing in the exhaust line; a heat exchanger that is provided between the exhaust heat recovery boiler and the carbon dioxide recovery device in the exhaust line and is configured to cool the exhaust gas to a temperature set in advance; and a circulation line that branches from a position between the carbon dioxide recovery device and the heat exchanger in the exhaust line and is connected to an inlet of the gas turbine. The carbon dioxide recovery device has an absorption tower which is configured to absorb carbon dioxide contained in the exhaust gas by causing the exhaust gas at the temperature set in advance and an absorption liquid to come into contact with each other. The heat exchanger is formed of a material having a higher corrosion resistance than a material forming the exhaust heat recovery boiler.

Advantageous Effects of Invention

According to the gas turbine plant of the present disclosure, carbon dioxide can be recovered with higher efficiency.

DESCRIPTION OF EMBODIMENT (Constitution of Gas Turbine Plant)

Figure 1:
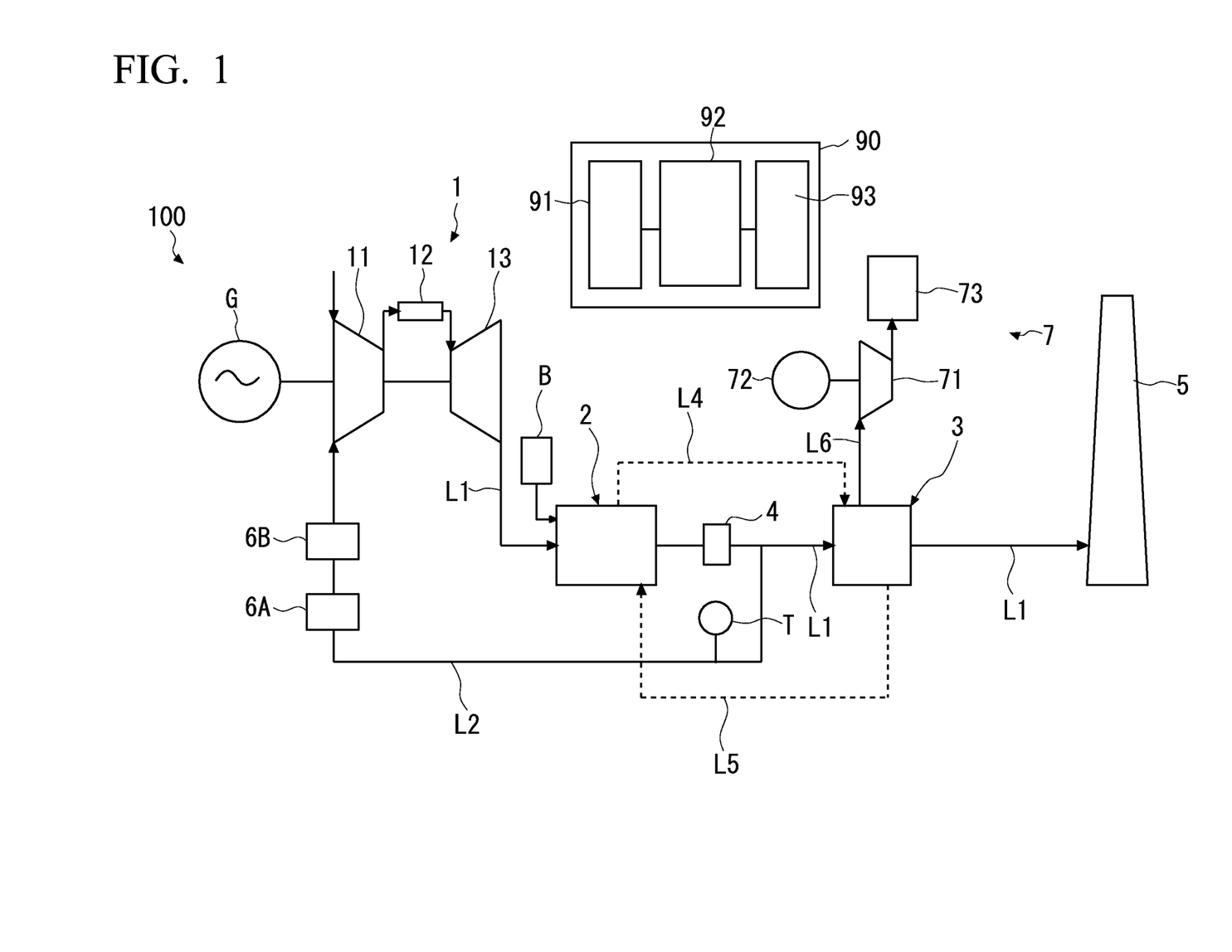
FIG. 1 is a schematic view illustrating a constitution of a gas turbine plant according to an embodiment of the present disclosure.

Hereinafter, a gas turbine plant 100 according to an embodiment of the present disclosure will be described with reference to FIGS. 1 to 3. As illustrated in FIG. 1, the gas turbine plant 100 according to the present embodiment includes a gas turbine 1, an exhaust heat recovery boiler 2, a carbon dioxide recovery device 3, a heat exchanger 4, a smokestack 5, a moisture separation device 6A, an intake filter 6B, a carbon dioxide compression apparatus 7, an exhaust line L1, a circulation line L2, a steam supply line L4, a steam recovery line L5, a supplementary combustion burner B, and a control device 90.

(Constitution of Gas Turbine)

The gas turbine 1 has a compressor 11, a combustor 12, and a turbine 13. The compressor 11 generates high-pressure compressed air by compressing air taken in from outside. The combustor 12 generates high-temperature/high-pressure combustion gas through combustion of a mixture of this compressed air and fuel. The turbine 13 is rotatively driven by means of combustion gas. For example, a rotation force of the turbine 13 is utilized for driving of a generator G connected to the same shaft as the turbine 13. High-temperature exhaust gas is discharged from the turbine 13. This exhaust gas is sent through the exhaust line L1 connected to a downstream side of the turbine 13 to the exhaust heat recovery boiler 2 provided on the exhaust line L1.

(Overview of Exhaust Heat Recovery Boiler)

The exhaust heat recovery boiler 2 generates high-temperature/high-pressure steam by performing heat exchange between exhaust gas of the gas turbine 1 and water. A constitution of the exhaust heat recovery boiler will be described below. The carbon dioxide recovery device 3 is provided on the downstream side of the exhaust heat recovery boiler 2 on the exhaust line L1. Low-temperature exhaust gas which has been subjected to heat exchange with water by the exhaust heat recovery boiler 2 is sent to this carbon dioxide recovery device 3 through the exhaust line L1.

(Overview of Carbon Dioxide Recovery Device)

In the carbon dioxide recovery device 3, when an absorption liquid having amine as a main component is brought into gas-liquid contact with exhaust gas, carbon dioxide contained in the exhaust gas becomes chemically bonded to the absorption liquid. (An absorption liquid may be a chemical absorbent having components other than amine.) Accordingly, a great part or all of the carbon dioxide in the exhaust gas is removed. A constitution of the carbon dioxide recovery device 3 will be described below. Exhaust gas after carbon dioxide is removed therefrom is sent to the smokestack 5 through the exhaust line L1 and diffuses into the atmosphere.

On the other hand, carbon dioxide separated from exhaust gas is sent to the carbon dioxide compression apparatus 7 through a recovery line L6. The carbon dioxide compression apparatus 7 has a compressor main body 71, a drive unit 72, and a storage unit 73. The compressor main body 71 is driven by the drive unit 72 so as to compress carbon dioxide. Compressed carbon dioxide is liquefied and is then transported to the storage unit 73.

(Constitution of Circulation Line)

On the foregoing exhaust line L1, one end of the circulation line L2 branching from the exhaust line L1 is connected to a part at a position between the exhaust heat recovery boiler 2 and the carbon dioxide recovery device 3. The other end of the circulation line L2 is connected to the compressor 11 of the gas turbine 1. Namely, a part of exhaust gas flowing in the exhaust line L1 can be caused to flow back to the gas turbine 1 (compressor 11) through this circulation line L2. In addition, a temperature sensor T serving as a measurement part of outlet temperature, the moisture separation device 6A, and the intake filter 6B are provided on the circulation line L2.

The temperature sensor T measures the temperature of exhaust gas. The value of the temperature measured by the temperature sensor T is sent to the control device 90 as an electrical signal. The moisture separation device 6A removes moisture contained in the exhaust gas circulating in the circulation line L2. The intake filter 6B removes air taken in from the atmosphere and soot and dust contained in the exhaust gas circulating in the circulation line L2. A constitution in which no moisture separation device 6A and no intake filter 6B is provided can also be employed.

(Overview of Heat Exchanger)

On the exhaust line L1, the heat exchanger 4 is provided at a position on an upstream side of a branch point of the circulation line L2 and the exhaust line L1 described above, and on the downstream side of the exhaust heat recovery boiler 2. The heat exchanger 4 cools exhaust gas circulating in the exhaust line L1 to a temperature set in advance. Exhaust gas cooled by the heat exchanger 4 is sent to the carbon dioxide recovery device 3 on the downstream side through the exhaust line L1. A constitution of the heat exchanger 4 will be described below.

(Piping System of Steam)

Next, a piping system for steam in the gas turbine plant 100 will be described. The exhaust heat recovery boiler 2 is connected to the carbon dioxide recovery device 3 through the steam supply line L4. Steam generated in the exhaust heat recovery boiler 2 is supplied to the carbon dioxide recovery device 3 through this steam supply line L4. Details will be described below. In the carbon dioxide recovery device 3, carbon dioxide is separated from an absorption liquid in a state in which carbon dioxide has been bonded thereto, due to heat of steam supplied through the steam supply line L4. Steam (or water) which is at a low temperature after being utilized in the carbon dioxide recovery device 3 is sent to the exhaust heat recovery boiler 2 again through the steam recovery line L5. A condenser 61 for returning low-temperature steam which has been recovered from the carbon dioxide recovery device 3 to water, and a water feeding pump 62 for pressure-feeding this water are provided on the steam recovery line L5 (refer to FIG. 2).

(Constitutions of Exhaust Heat Recovery Boiler and Heat Exchanger)

Next, with reference to FIG. 2, constitutions of the exhaust heat recovery boiler 2 and the heat exchanger 4 will be described. As illustrated in the same diagram, the exhaust heat recovery boiler 2 has a flue 21; a coal economizer 22, a vaporizer 23, and a superheater 24 which are disposed inside this flue 21; a steam turbine ST; the condenser 61; and the water feeding pump 62. Inside the flue 21, the coal economizer 22, the vaporizer 23, and the superheater 24 are arranged in this order from the downstream side toward the upstream side in a direction in which exhaust gas flows. The heat exchanger 4 is provided on the upstream side of the coal economizer 22 in a water-feeding direction.

The heat exchanger 4 is connected to the downstream side of the steam recovery line L5. The heat exchanger 4 has a cylinder 41 communicating with the flue 21, and a heat exchanger main body 42 provided inside this cylinder 41.

Figure 2:
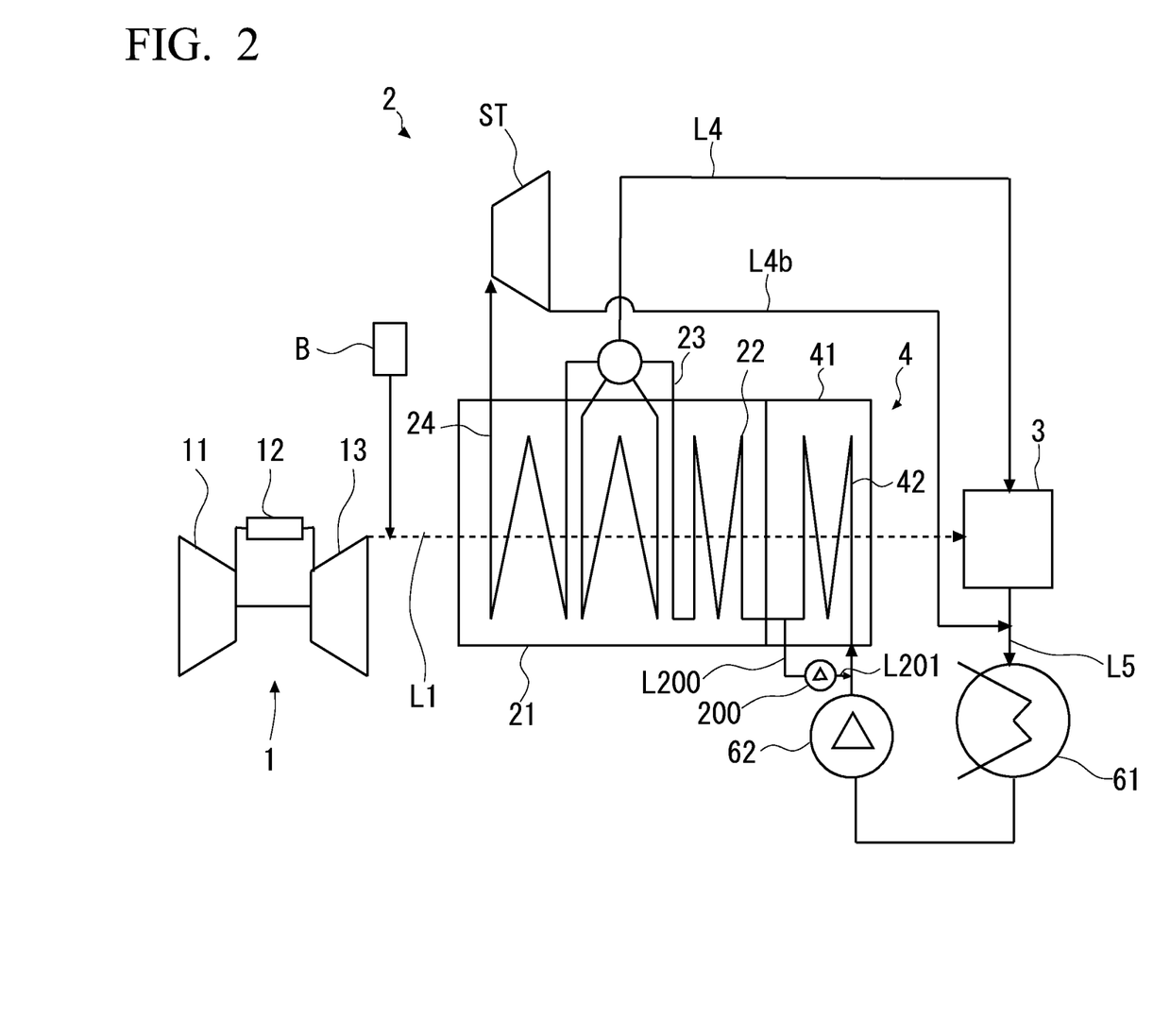
FIG. 2 is a schematic view illustrating a constitution of an exhaust heat recovery boiler according to the embodiment of the present disclosure.
Figure 3:
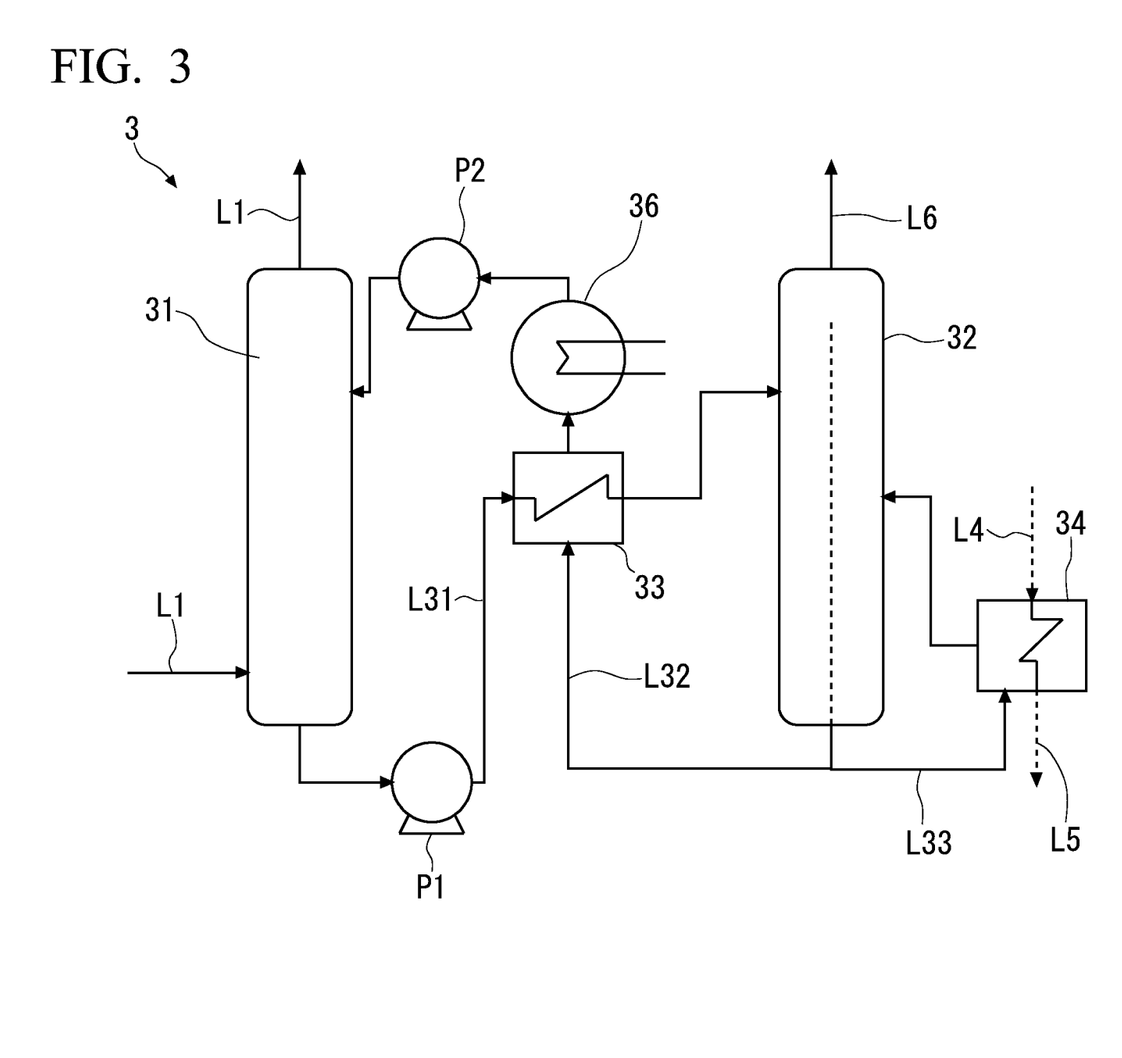
FIG. 3 is a schematic view illustrating a constitution of a carbon dioxide recovery device according to the embodiment of the present disclosure.

When the carbon dioxide recovery device 3 is not connected to a latter stage of this heat exchanger 4, a recirculation system having a piping L200, a circulation pump 200, and a piping L201 in FIG. 2 can be provided. When the exit temperature of the heat exchanger 4 is heated to 80° C. or higher by adjusting the circulation flow rate in the recirculation system, water condensation in the exhaust gas inside the heat exchanger 4 can be curbed. Accordingly, corrosion of a piping 42 is avoided and a high exit temperature of the smokestack 5 is maintained so that corrosion or generation of white smoke at the exit are curbed. On the other hand, in the present embodiment, the temperature of exhaust gas at the exit of the heat exchanger 4 can be reduced and costs can be reduced by eliminating this circulation system. In each of the parts constituting the heat exchanger 4, piping in which steam or water circulates (heat exchanger main body 42) is formed of a material having a higher corrosion resistance than piping of the exhaust heat recovery boiler 2. Regarding such a material, specifically, SUS or Inconel is favorably used (the piping of the exhaust heat recovery boiler 2 is generally formed of a carbon steel as an example).

The coal economizer 22 performs heat exchange between water sent through the heat exchanger 4 and exhaust gas, thereby heating the water. The vaporizer 23 performs heat exchange between high-temperature water which has been heated by the coal economizer 22 and exhaust gas, thereby further heating the water and generating steam. This steam is sent to the superheater 24. The superheater 24 generates superheated steam by superheating steam through heat exchange with exhaust gas.

Superheated steam generated by the superheater 24 is sent to the steam turbine ST. The steam turbine ST is rotatively driven by steam so as to supply power to a generator or the like (not illustrated) connected to the same shaft. In addition, at least a part of steam generated by the vaporizer 23 is sent to the carbon dioxide recovery device 3 through the steam supply line L4 described above and is utilized as a heat source. In addition, exhaust air of the steam turbine ST is sent to the condenser 61 through a turbine exhaust line L4b. A constitution in which no steam turbine ST is provided can also be employed.

Moreover, the supplementary combustion burner B for supplementary heating of exhaust gas is provided at an end portion of the entrance side of the flue 21 (namely, a side on which exhaust gas flows in). Regarding the supplementary combustion burner B, specifically, a burner or a torch forming a combustion flame using fuel shared with the combustor 12 described above is favorably used. An output of the supplementary combustion burner B can be changed by the control device 90 on the basis of a measurement value of the temperature sensor T.

(Constitution of Carbon Dioxide Recovery Device)

Subsequently, with reference to FIG. 3, a constitution of the carbon dioxide recovery device 3 will be described. As illustrated in the same diagram, the carbon dioxide recovery device 3 has an absorption tower 31, a regeneration tower 32, a heat exchanger 33, a reboiler 34, a cooler 36, a first pump P1, and a second pump P2.

The absorption tower 31 has a tubular shape extending in an upward-downward direction, and the exhaust line L1 is connected to a lower portion thereof. Inside the absorption tower 31, an absorption liquid which can be chemically bonded to carbon dioxide flows downward from above. Regarding such an absorption liquid, specifically, an aqueous solution of amine including monoethanolamine (MEA), diethanolamine (DEA), triethanolamine (TEA), diisopropanolamine (DIPA), and methyldiethanolamine (MDEA), an organic solvent containing no water, a mixture thereof, or an amino acid-based aqueous solution is favorably used. In addition, an absorption liquid other than amine may be used.

Exhaust gas which has flowed into the lower portion inside the absorption tower 31 rises inside the absorption tower 31 while coming into contact with an absorption liquid flowing from above. At this time, carbon dioxide contained in the exhaust gas is chemically absorbed into the absorption liquid. The remaining exhaust gas from which carbon dioxide has been removed flows into the exhaust line L1 again from an upper portion of the absorption tower 31.

The absorption liquid that has absorbed carbon dioxide is sent to the heat exchanger 33 through an absorption liquid recovery line L31 connected to the lower portion of the absorption tower 31. The first pump P1 for pressure-feeding an absorption liquid is provided on the absorption liquid recovery line L31. Details will be described below. In the heat exchanger 33, heat exchange is performed between an absorption liquid which has been regenerated by being heated in the regeneration tower 32 and an absorption liquid before regeneration. Accordingly, the absorption liquid before regeneration is in a state in which the temperature thereof has risen to a certain degree. After passing through the heat exchanger 33, the absorption liquid before regeneration is sent to the upper portion of the regeneration tower 32 through the absorption liquid recovery line L31.

The regeneration tower 32 is a device for regenerating an absorption liquid in a state in which carbon dioxide has been absorbed (carbon dioxide has been separated out). A part of an absorption liquid heating line L33 is inserted into the regeneration tower 32. The reboiler 34 is provided on the absorption liquid heating line L33. High-temperature steam is supplied to the reboiler 34 through the steam supply line L4 described above. In the reboiler 34, due to heat exchange with this steam, a part of water contained in the absorption liquid is heated and becomes stripping steam. Inside the regeneration tower 32, stripping steam comes into contact with the absorption liquid before regeneration supplied through the absorption liquid heating line L33. Accordingly, carbon dioxide diffuses from the absorption liquid before regeneration, and the absorption liquid is regenerated (is brought into a state containing no carbon dioxide). Carbon dioxide which has diffused from the absorption liquid before regeneration is sent to the carbon dioxide compression apparatus 7 described above through the recovery line L6 connected to the upper portion of the regeneration tower 32.

A part of the absorption liquid after regeneration (that is, a component which has not become stripping steam) is sent to an extraction line L32 connected to a lower portion of the regeneration tower 32. The heat exchanger 33, the cooler 36, and the second pump P2 are provided in this order on the extraction line L32. When the second pump P2 is driven, the absorption liquid after regeneration is supplied from the regeneration tower 32 to the heat exchanger 33.

The second pump P2 may be provided between the heat exchanger 33 and the regeneration tower 32 or between the cooler 36 and the heat exchanger 33. In the heat exchanger 33, as described above, heat exchange is performed between the absorption liquid before regeneration and the absorption liquid after regeneration. The temperature of the absorption liquid after regeneration falls while passing through the heat exchanger 33 and the cooler 36. The low-temperature absorption liquid after regeneration is supplied to the upper portion of the absorption tower 31.

(Constitution of Control Device)

Subsequently, the control device 90 will be described. As illustrated in FIG. 1, this control device 90 has an input unit 91, a determination unit 92, and a burner adjustment unit 93. The temperature of exhaust gas in the circulation line L2 measured by the temperature sensor T is input as an electrical signal to the input unit 91. The determination unit 92 determines whether or not the temperature of exhaust gas measured by the temperature sensor T is within a range set in advance. The burner adjustment unit 93 sends out a signal for adjusting an output of the supplementary combustion burner B (that is, an amount of fuel supply) on the basis of a signal sent from the determination unit 92.

Here, inside the exhaust heat recovery boiler 2, a temperature and a pressure of generated steam are set in accordance with performance requirements of the vaporizer 23. Therefore, for example, when the temperature of exhaust gas flowing into the exhaust heat recovery boiler 2 is changed in an increasing direction, the temperature of exhaust gas at the exit of the heat exchanger 4 changes in a decreasing direction to maintain the temperature and the pressure. On the other hand, when the temperature of exhaust gas flowing into the exhaust heat recovery boiler 2 is changed in the decreasing direction, the temperature of exhaust gas at the exit of the heat exchanger changes in the increasing direction to maintain the temperature and the pressure described above. Here, in the present embodiment, the control device 90 changes the output of the supplementary combustion burner B on the basis of the temperature of exhaust gas measured by the temperature sensor T serving as a measurement part of outlet temperature.

Specifically, when the determination unit 92 determines that the temperature measured by the temperature sensor T is higher than the temperature set in advance, the burner adjustment unit 93 changes the output of the supplementary combustion burner B in the increasing direction. As a result, the temperature of exhaust gas at the entrance of the flue 21 rises, whereas the exit temperature of the heat exchanger 4 (temperature of exhaust gas) changes in the decreasing direction. When the determination unit 92 determines that the temperature measured by the temperature sensor T is lower than the temperature set in advance, the burner adjustment unit 93 changes the output of the supplementary combustion burner B in the decreasing direction.

As a result, the temperature of exhaust gas at the entrance of the flue 21 falls, whereas the exit temperature of the heat exchanger 4 (temperature of exhaust gas) changes in the increasing direction. The aforementioned "temperature set in advance" indicates a temperature range in which an absorbent circulating in the absorption tower 31 of the carbon dioxide recovery device 3 can exhibit maximum absorption performance. Regarding such a temperature, specifically, it is desirable to be within a range of 30° C. to 50° C. More desirably, this temperature range is 35° C. to 45° C.

Most desirably, this temperature is set to 40° C.

(Operational Effects)

Next, operation of the gas turbine plant 100 according to the present embodiment will be described. When the gas turbine 1 is driven, exhaust gas is generated from the turbine 13. The temperature of this exhaust gas falls while passing through the exhaust heat recovery boiler 2, and then the exhaust gas flows into the carbon dioxide recovery device 3.

In the carbon dioxide recovery device 3, carbon dioxide is removed from exhaust gas as described above. Thereafter, the exhaust gas diffuses into the atmosphere from the smokestack 5. Carbon dioxide removed from exhaust gas is liquefied and stored by the carbon dioxide compression apparatus 7.

Here, in the carbon dioxide recovery device 3 described above, a chemical agent having amine as a main component is used as an absorption liquid. This absorption liquid has an appropriate temperature range for efficiently absorbing carbon dioxide. Namely, when the temperature of exhaust gas is excessively high or excessively low, there is concern that the efficiency of absorption of carbon dioxide may deteriorate.

Here, in the gas turbine plant 100 according to the present embodiment, the heat exchanger 4 is provided on the downstream side of the exhaust heat recovery boiler 2 on the exhaust line L1. According to this constitution, exhaust gas discharged from the exhaust heat recovery boiler 2 passes through the heat exchanger 4 so as to be cooled to the temperature set in advance described above and is then sent to the carbon dioxide recovery device 3. Namely, the temperature of exhaust gas can be reduced to a favorable reaction temperature region of the absorption liquid. Therefore, carbon dioxide in the exhaust gas can be more efficiently absorbed by the absorption liquid.

In the heat exchanger 4, when exhaust gas is cooled, there is a likelihood that moisture contained in the exhaust gas will be condensed and dewing will occur. Due to such dewing, there is also concern that corrosion may occur in the piping inside the heat exchanger 4. However, in the foregoing constitution, the piping (heat exchanger main body 42) of the heat exchanger 4 is formed of a material having a higher corrosion resistance than a material forming the exhaust heat recovery boiler 2. Therefore, even when the dewing has occurred, a likelihood of occurrence of corrosion inside the heat exchanger 4 can be reduced.

Here, inside the exhaust heat recovery boiler 2, the temperature and the pressure of generated steam are set on the basis of performance requirements of the vaporizer 23. Therefore, for example, when the temperature of exhaust gas flowing into the exhaust heat recovery boiler 2 is changed in the increasing direction, the temperature of exhaust gas at the exit of the heat exchanger 4 changes in the decreasing direction to maintain the temperature and the pressure. On the other hand, when the temperature of exhaust gas flowing into the exhaust heat recovery boiler 2 is changed in the decreasing direction, the temperature of exhaust gas at the exit of the heat exchanger 4 changes in the increasing direction to maintain the temperature and the pressure described above. Namely, according to the foregoing constitution, when the control device 90 changes the output of the supplementary combustion burner B on the basis of the temperature measured by the temperature sensor T serving as a measurement part of outlet temperature, the exit temperature of the heat exchanger 4 can be freely adjusted. As a result, the temperature of exhaust gas flowing into the carbon dioxide recovery device 3 can be more minutely controlled.

Specifically, according to the foregoing constitution, when the temperature measured by the temperature sensor T is higher than the temperature set in advance, the control device 90 changes the output of the supplementary combustion burner B in the increasing direction. Accordingly, the exit temperature of the heat exchanger 4 can be reduced. As a result, the temperature of exhaust gas flowing into the carbon dioxide recovery device 3 can be more minutely controlled.

In addition, according to the foregoing constitution, when the temperature measured by the temperature sensor T is lower than the temperature set in advance, the control device 90 changes the output of the supplementary combustion burner B in the decreasing direction. Accordingly, the exit temperature of the heat exchanger 4 can be increased. As a result, the temperature of exhaust gas flowing into the carbon dioxide recovery device 3 can be more minutely controlled.

Furthermore, according to the foregoing constitution, in the heat exchanger 4, exhaust gas is cooled such that the temperature thereof is within a range of 30° C. to 50° C. Accordingly, carbon dioxide can be more efficiently absorbed and removed from exhaust gas in the carbon dioxide recovery device 3 connected to the downstream side of the heat exchanger 4.

Moreover, according to the foregoing constitution, the carbon dioxide recovery device 3 can be attached to an existing gas turbine plant afterward by only providing the heat exchanger 4. Namely, the carbon dioxide recovery device 3 can be attached to an existing gas turbine plant without performing large-scale repair. Accordingly, environmental performance of an existing gas turbine plant can be improved at lower costs. Moreover, due to the foregoing supplementary combustion burner B, the amount of steam generated in the exhaust heat recovery boiler 2 can be increased, and a decrease in output of the steam turbine in FIG. 2 caused by steam to be supplied to the reboiler 34 in FIG. 3 can be restored.

Generally, when the carbon dioxide recovery device 3 is installed in a coal-fired boiler, an oil-fired boiler, or a GTCC exhaust gas system, since the temperature of exhaust gas described above is higher than an operation temperature of the absorption tower 31, a constitution in which a quencher disposed in a former stage of the absorption tower 31 is conceivable for the purpose of reducing the temperature or removing impurities in the exhaust gas. In the present embodiment, the temperature of exhaust gas can be reduced to the operation temperature of the absorption tower 31. Therefore, a quencher can be unequipped or miniaturized.

OTHER EMBODIMENTS

Hereinabove, the embodiment of the present disclosure has been described in detail with reference to the drawings. However, the specific constitution is not limited to this embodiment and also includes design change and the like within a range not departing from the gist of the present disclosure.

Figure 4:
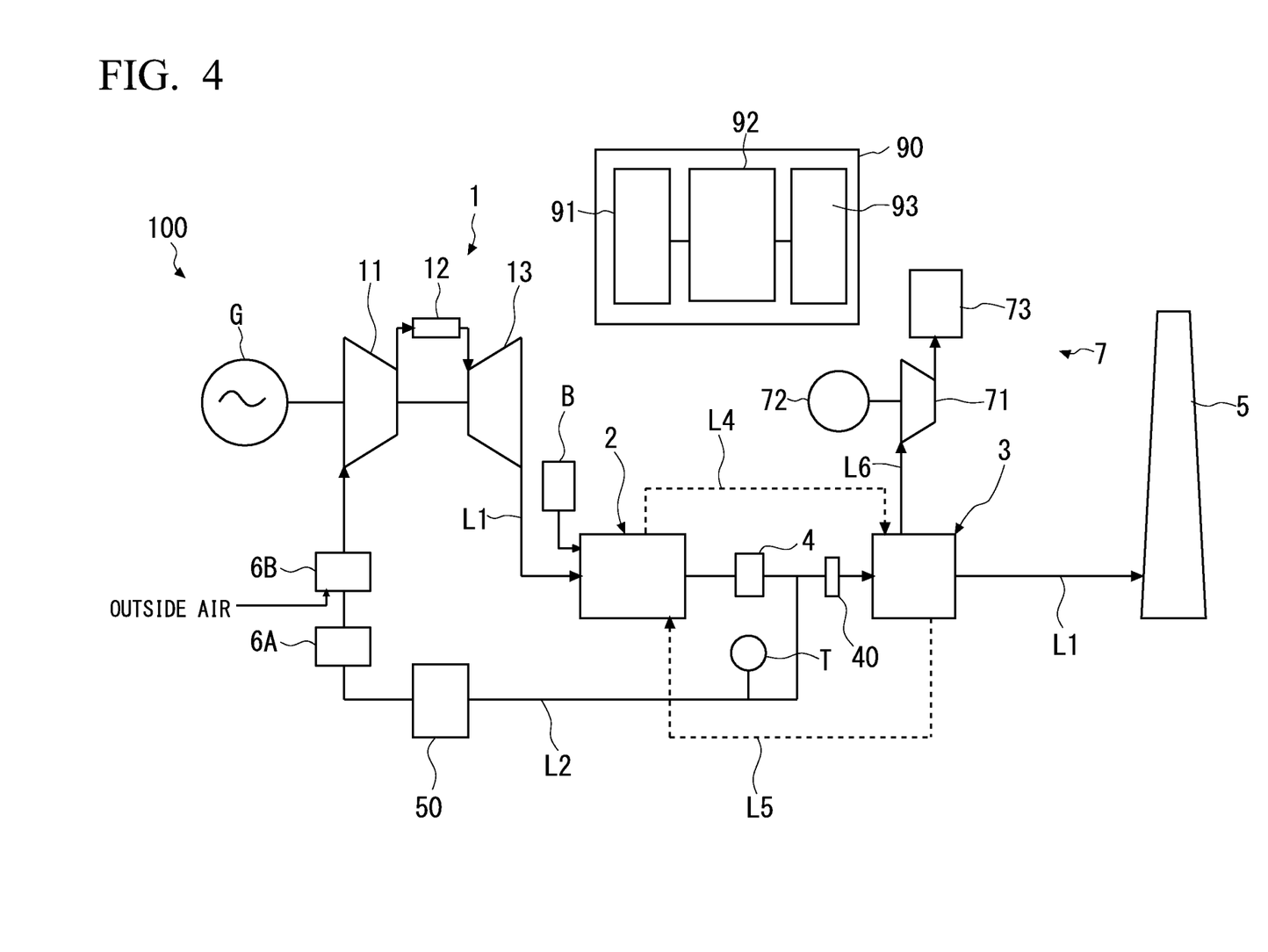
FIG. 4 is a schematic view illustrating a modification example of the gas turbine plant according to the embodiment of the present disclosure.

For example, in addition to the constitutions of the foregoing embodiment, as illustrated in FIG. 4, a constitution further including a quencher 40 and an exhaust gas cooler 50 can also be employed. The quencher 40 is provided between the heat exchanger 4 and the carbon dioxide recovery device 3 in the exhaust line L1. The quencher 40 is a cooling device for further reducing the temperature of exhaust gas discharged from the heat exchanger 4. When the quencher 40 is provided, the temperature of exhaust gas can be further reduced (cooled) before the exhaust gas flows into the carbon dioxide recovery device 3. Therefore, for example, even when exhaust gas in the heat exchanger 4 is insufficiently cooled, a cooling effect can be supplemented by the quencher 40. In the foregoing embodiment, since the temperature of exhaust gas has become low in advance by the heat exchanger 4, even when the quencher 40 is provided, for instance, a capacity of the quencher 40 can be curbed to a very small level. Accordingly, a further reduction of manufacturing costs can be achieved.

The exhaust gas cooler 50 is provided on the upstream side of the compressor 11 in the circulation line L2. The exhaust gas cooler 50 is a device for reducing the temperature of exhaust gas flowing into the compressor 11. When the exhaust gas cooler 50 is provided, efficiency of compressing the compressor 11 can be further improved. In the foregoing embodiment, since the temperature of exhaust gas has become low in advance by the heat exchanger 4, even when the exhaust gas cooler 50 is provided, for instance, the capacity of the exhaust gas cooler 50 can be curbed to a very small level. Accordingly, further reduction of manufacturing costs can be achieved.

<Appendix>

The gas turbine plant described in each embodiment is ascertained as follows, for example.

(1) A gas turbine plant (100) according to a first aspect includes a gas turbine (1) that is configured to be driven by means of combustion gas generated due to combustion of fuel; an exhaust line (L1) that is configured to guide exhaust gas discharged from the gas turbine (1) to the outside; an exhaust heat recovery boiler (2) that is provided in the exhaust line (L1), is configured to generate steam due to heat of the exhaust gas discharged from the gas turbine (1), and guide the exhaust gas which has passed through the inside of the exhaust heat recovery boiler (2) to the exhaust line (L1); a carbon dioxide recovery device (3) that is provided on a downstream side of the exhaust heat recovery boiler (2) in the exhaust line (L1) and is configured to recover carbon dioxide contained in the exhaust gas flowing in the exhaust line (L1); a heat exchanger (4) that is provided between the exhaust heat recovery boiler (2) and the carbon dioxide recovery device (3) in the exhaust line (L1) and is configured to cool the exhaust gas to a temperature set in advance; and a circulation line (L2) that branches from a position between the carbon dioxide recovery device (3) and the heat exchanger (4) in the exhaust line (L1) and is connected to an inlet of the gas turbine (1). The carbon dioxide recovery device (3) has an absorption tower (31) which is configured to absorb carbon dioxide contained in the exhaust gas by causing the exhaust gas at the temperature set in advance and an absorption liquid to come into contact with each other. The heat exchanger (4) is formed of a material having a higher corrosion resistance than a material forming the exhaust heat recovery boiler (2).

Here, in the carbon dioxide recovery device (3), a chemical agent having amine as a main component is used as an example of an absorption liquid. This absorption liquid has an appropriate temperature range set in advance for efficiently absorbing carbon dioxide. Namely, when the temperature of exhaust gas is excessively high or excessively low, efficiency of absorption of carbon dioxide deteriorates. According to the foregoing constitution, exhaust gas discharged from the exhaust heat recovery boiler (2) passes through the heat exchanger (4) so as to be cooled to the temperature set in advance and is then sent to the carbon dioxide recovery device (3). Therefore, carbon dioxide in the exhaust gas can be more efficiently absorbed by the absorption liquid.

(2) The gas turbine plant (100) according to a second aspect further includes a measurement part of outlet temperature (T) that is configured to measure an exit temperature of the heat exchanger (4), a supplementary combustion burner (B) that is configured to heat the exhaust gas flowing into the exhaust heat recovery boiler (2), and a control device (90) that is configured to change an output of the supplementary combustion burner (B) on the basis of the exit temperature.

Here, inside the exhaust heat recovery boiler (2), the temperature and the pressure of generated steam are set. Therefore, for example, when the temperature of exhaust gas flowing into the exhaust heat recovery boiler (2) is changed in an increasing direction, the temperature of exhaust gas at the exit of the heat exchanger (4) changes in a decreasing direction to maintain the temperature and the pressure. On the other hand, when the temperature of exhaust gas flowing into the exhaust heat recovery boiler (2) is changed in the decreasing direction, the temperature of exhaust gas at the exit of the heat exchanger (4) changes in the increasing direction to maintain the temperature and the pressure described above. Namely, according to the foregoing constitution, the control device (90) changes the output of the supplementary combustion burner (B) on the basis of the temperature measured by the measurement part of outlet temperature (T). Accordingly, the exit temperature of the heat exchanger (4) can be freely adjusted. As a result, the temperature of exhaust gas flowing into the carbon dioxide recovery device (3) can be more minutely controlled.

(3) In the gas turbine plant (100) according to a third aspect, the control device (90) changes an output of the supplementary combustion burner (B) in an increasing direction when the exit temperature is higher than the temperature set in advance.

Here, inside the exhaust heat recovery boiler (2), the temperature and the pressure of generated steam are set. Therefore, for example, when the temperature of exhaust gas flowing into the exhaust heat recovery boiler (2) is changed in the increasing direction, the temperature of exhaust gas at the exit of the heat exchanger (4) changes in the decreasing direction to maintain the temperature and the pressure. Namely, according to the foregoing constitution, when the temperature measured by the measurement part of outlet temperature (T) is higher than the temperature set in advance, the control device (90) changes the output of the supplementary combustion burner (B) in the increasing direction so that the exit temperature of the heat exchanger (4) can be reduced. As a result, the temperature of exhaust gas flowing into the carbon dioxide recovery device (3) can be more minutely controlled.

(4) In the gas turbine plant (100) according to a fourth aspect, the control device (90) changes an output of the supplementary combustion burner (B) in a decreasing direction when the exit temperature is lower than the temperature set in advance.

Here, inside the exhaust heat recovery boiler (2), the temperature and the pressure of generated steam are set. Therefore, for example, when the temperature of exhaust gas flowing into the exhaust heat recovery boiler (2) is changed in the decreasing direction, the temperature of exhaust gas at the exit of the heat exchanger (4) changes in the increasing direction to maintain the temperature and the pressure described above. Namely, according to the foregoing constitution, when the temperature measured by the measurement part of outlet temperature (T) is lower than the temperature set in advance, the control device (90) changes the output of the supplementary combustion burner (B) in the decreasing direction. Accordingly, the exit temperature of the heat exchanger (4) can be increased. As a result, the temperature of exhaust gas flowing into the carbon dioxide recovery device (3) can be more minutely controlled.

(5) In the gas turbine plant (100) according to a fifth aspect, the temperature set in advance is within a range of 30° C. to 50° C.

According to the foregoing constitution, in the heat exchanger (4), exhaust gas is cooled such that the temperature thereof is within a range of 30° C. to 50° C. Accordingly, in the carbon dioxide recovery device (3) connected to the downstream side of the heat exchanger (4), carbon dioxide can be more efficiently absorbed and removed from exhaust gas.

(6) In the gas turbine plant (100) according to a sixth aspect, the carbon dioxide recovery device (3) further has a quencher (40) for cooling the exhaust gas flowing into the absorption tower (31).

According to the foregoing constitution, the temperature of exhaust gas can be further reduced (cooled) by the quencher (40) before the exhaust gas flows into the absorption tower (31). Therefore, for example, even when exhaust gas in the heat exchanger (4) is insufficiently cooled, a cooling effect can be supplemented by the quencher (40).

INDUSTRIAL APPLICABILITY

According to an aspect of the present invention, carbon dioxide can be recovered with higher efficiency.

REFERENCE SIGNS LIST

100 Gas turbine plant
1 Gas turbine
2 Exhaust heat recovery boiler
3 Carbon dioxide recovery device
4 Heat exchanger
5 Smokestack
6A Moisture separation device
6B Intake filter
7 Carbon dioxide compression apparatus
11 Compressor
12 Combustor
13 Turbine
21 Flue
22 Coal economizer
23 Vaporizer
24 Superheater
31 Absorption tower
32 Regeneration tower
33 Heat exchanger
34 Reboiler
36 Cooler
40 Quencher
41 Cylinder
42 Heat exchanger main body
50 Exhaust gas cooler
61 Condenser
62 Water feeding pump
90 Control device
91 Input unit
92 Determination unit
93 Burner adjustment unit
200 Circulation pump
B Burner
G Generator
T Temperature sensor
L1 Exhaust line
L2 Circulation line
L4 Steam supply line
L4b Turbine exhaust line
L5 Steam recovery line
L6 Recovery line
L31 Absorbent recovery line
L32 Extraction line
L33 Absorbent heating line
L200, L201 Piping
P1 First pump
P2 Second pump
ST Steam turbine

The invention claimed is:

1. A gas turbine plant comprising:
a gas turbine that is configured to be driven by means of combustion gas generated due to combustion of fuel;
an exhaust line that is configured to guide exhaust gas discharged from the gas turbine to the outside;
an exhaust heat recovery boiler that is provided in the exhaust line, is configured to generate steam due to heat of the exhaust gas discharged from the gas turbine, and guide the exhaust gas which has passed through an inside of the exhaust heat recovery boiler to the exhaust line;

a carbon dioxide recovery device that is provided on a downstream side of the exhaust heat recovery boiler in the exhaust line and is configured to recover carbon dioxide contained in the exhaust gas flowing in the exhaust line;

a heat exchanger that is provided between the exhaust heat recovery boiler and the carbon dioxide recovery device in the exhaust line and is configured to cool the exhaust gas to a temperature set in advance;

a circulation line that branches from a position between the carbon dioxide recovery device and the heat exchanger in the exhaust line and is connected to an inlet of the gas turbine;

an outlet temperature measurement part that is configured to measure an exit temperature of the heat exchanger;

a supplementary combustion burner that is configured to heat the exhaust gas flowing into the exhaust heat recovery boiler; and a control device that is configured to change an output of the supplementary combustion burner on the basis of the exit temperature, wherein the carbon dioxide recovery device has an absorption tower which is configured to absorb carbon dioxide contained in the exhaust gas by causing the exhaust gas at the temperature set in advance and an absorption liquid to come into contact with each other, and wherein the heat exchanger is formed of a material having a higher corrosion resistance than a material forming the exhaust heat recovery boiler.

2. The gas turbine plant according to claim 1, wherein the control device changes an output of the supplementary combustion burner in an increasing direction when the exit temperature is higher than the temperature set in advance.

3. The gas turbine plant according to claim 1, wherein the control device changes an output of the supplementary combustion burner in a decreasing direction when the exit temperature is lower than the temperature set in advance.

4. The gas turbine plant according to claim 1, wherein the temperature set in advance is within a range of 30° C. to 50° C.

5. The gas turbine plant according to claim 1, wherein the carbon dioxide recovery device further has a quencher for cooling the exhaust gas flowing into the absorption tower.

6. A gas turbine plant comprising:

a gas turbine that is configured to be driven by means of combustion gas generated due to combustion of fuel;

an exhaust line that is configured to guide exhaust gas discharged from the gas turbine to the outside;

an exhaust heat recovery boiler that is provided in the exhaust line, is configured to generate steam due to heat of the exhaust gas discharged from the gas turbine, and guide the exhaust gas which has passed through an inside of the exhaust heat recovery boiler to the exhaust line;

a carbon dioxide recovery device that is provided on a downstream side of the exhaust heat recovery boiler in the exhaust line and is configured to recover carbon dioxide contained in the exhaust gas flowing in the exhaust line;

a heat exchanger that is provided between the exhaust heat recovery boiler and the carbon dioxide recovery device in the exhaust line and is configured to cool the exhaust gas to a temperature set in advance;

a circulation line that branches from a position between the carbon dioxide recovery device and the heat exchanger in the exhaust line and is connected to an inlet of the gas turbine;

a steam turbine configured to be driven by the steam generated by the exhaust heat recovery boiler;

a condenser configured to return the steam discharged from the steam turbine to water; and a steam recovery line configured to guide water in the condenser to the exhaust heat recovery boiler, wherein the carbon dioxide recovery device has an absorption tower which is configured to absorb carbon dioxide contained in the exhaust gas by causing the exhaust gas at the temperature set in advance and an absorption liquid to come into contact with each other, wherein the heat exchanger is formed of a material having a higher corrosion resistance than a material forming the exhaust heat recovery boiler, and wherein the heat exchanger is provided in the steam recovery line and configured to perform heat exchange between the water sent from the steam recovery line and the exhaust gas, thereby heating the water, which is sent to the exhaust heat recovery boiler, and cooling the exhaust gas.

7. The gas turbine plant according to claim 6, wherein the temperature set in advance is within a range of 30° C. to 50° C.

8. The gas turbine plant according to claim 6, wherein the carbon dioxide recovery device further includes a quencher for cooling the exhaust gas flowing into the absorption tower.

* * * * *